(12) United States Patent
Lim et al.

(10) Patent No.: US 8,730,797 B2
(45) Date of Patent: May 20, 2014

(54) METHOD FOR FORWARDING DIRECT MESSAGE IN PARTIAL FUNCTION OFDMA RELAY SYSTEM

(75) Inventors: Eun-Taek Lim, Suwon-si (KR); Hyoung-Kyu Lim, Seoul (KR); Pan-Yuh Joo, Yongin-si (KR); Qi Wu, Beijing (CN); Zongchuang Liang, Beijing (CN)

(73) Assignees: Samsung Electronics Co., Ltd (KR); Beijing Samsung Telecom R&D Center (CN)

( * ) Notice: Subject to any disclaimer, the term of this patent is extended or adjusted under 35 U.S.C. 154(b) by 1076 days.

(21) Appl. No.: 12/597,843

(22) PCT Filed: Apr. 25, 2008

(86) PCT No.: PCT/KR2008/002363
§ 371 (c)(1),
(2), (4) Date: May 13, 2010

(87) PCT Pub. No.: WO2008/133447
PCT Pub. Date: Nov. 6, 2008

(65) Prior Publication Data
US 2010/0214973 A1    Aug. 26, 2010

(30) Foreign Application Priority Data
Apr. 27, 2007   (CN) .......................... 2007 1 0097583

(51) Int. Cl.
*H04L 12/26*     (2006.01)

(52) U.S. Cl.
USPC ......................................................... 370/230

(58) Field of Classification Search
None
See application file for complete search history.

(56) References Cited

U.S. PATENT DOCUMENTS

| 6,778,532 | B1 * | 8/2004 | Akahane et al. ............... 370/392 |
| 7,095,722 | B1 * | 8/2006 | Walke et al. ................... 370/315 |
| 7,324,454 | B2 * | 1/2008 | Horinouchi et al. ........... 370/242 |
| 2004/0176094 | A1 * | 9/2004 | Kim et al. ...................... 455/438 |
| 2006/0221825 | A1 * | 10/2006 | Okano ............................ 370/229 |
| 2006/0264172 | A1 | 11/2006 | Izumikawa et al. |

FOREIGN PATENT DOCUMENTS

WO    WO 2006/121381 A1    11/2006

OTHER PUBLICATIONS

Lei Huang et al., Resource Scheduling for OFDMA/TDD Based Relay Enhanced Cellular Networks, Wireless Communications and Networking Conference, Mar. 2007, pp. 1546-1550.

* cited by examiner

*Primary Examiner* — Raj Jain
(74) *Attorney, Agent, or Firm* — The Farrell Law Firm, P.C.

(57) ABSTRACT

A method for forwarding direct message in partial function OFDMA relay system is proposed in present invention. In present invention, the operations like forwarding and reflecting are fixed for the PFRS. Therefore, the BS performs scheduling according to the fixed operations so as to make the PFRS actually has the function of direct message forwarding.

8 Claims, 5 Drawing Sheets

(A) THE SCHEMATIC DIAGRAM ON
CONVENTIONAL MESSAGE FORWARDING

METHOD FOR FORWARDING DIRECT MESSAGE IN PARTIAL FUNCTION OFDMA RELAY SYSTEM

BACKGROUND OF THE INVENTION

1. Field of the Invention

The present invention relates to a WiMax/WiBro system, especially to a method for forwarding direct message in a partial function OFDMA relay system.

2. Description of the Related Art

In a WiMax/WiBro system, in order to save the cost, some RSs are designed to consist of only a RF module and a DFT/IDFT module and no modulation/demodulation module and encoder/decoder module. This RS is called a partial function RS (PFRS). FIG. 2 shows comparison of function modules between the partial function RS and a conventional full function RS (FFRS). Because of the omission of the modulation/demodulation and the encoder/decoder, the PFRS not only saves more cost than FFRS, but also the performance in delay of message forwarding is greatly improved in PFRS.

In a relay WiMax/WiBro system, direct message forwarding (DMF) is an important approach that makes full use of spectrum resource to improve the throughput and reduce the delay. The principle of direct message forwarding is illustrated in FIG. 3.

In FIG. 3a, a conventional process of message forwarding when two users within the same RS are in communication in a relay system is illustrated, i.e., the message is forwarded from user 1→RS 1→BS→RS 1→user 2. This conventional message forwarding method greatly wastes resources. To save the resource and improve system throughput, the DMF directly forwards the message to user 2 with no help of BS, as shown in FIG. 3b.

Because of lack of modulation and encoder modules in the partial function RS, the direct message forwarding can not be implemented with any existing method so that performance improvement resulted from direct message forwarding can not be realized.

In detail, the solution of existing DMF is as follows:
i) User 1 initiates a connection request;
ii) RS 1 receives the connection request for the user and determines a requested destination user, i.e., to determine whether user 2 is within its coverage or not. If yes, goes on iii~vii, otherwise, goes on ix~xv, that is, the conventional establishing flow for connection;
iii) RS 1 sends a connection indication to user 2;
iv) User 2 sends the connection responds to RS 1;
v) RS 1 sends a connection ACK to user 1;
vi) RS 1 sends a connection notification to the BS, informing it of a state of the established connection;
vii) After receiving this connection notification, the BS begins to charging;
ix) RS 1 forwards the connection request to the BS;
x) The BS sends a connection notification to the RS where user 2 locates, i.e., RS 2;
xi) RS 2 forwards the connection notification to user 2;
xii) User 2 sends a connection response to RS 2;
xiii) RS 2 forwards the connection response to BS;
xiv) BS sends a connection ACK to RS 1;
xv) RS 1 forwards the connection ACK to user 1.

The PFRS may not decode the connection request, so what it can do is to implement step ii (to determine whether the request destination user is within its coverage or not), step iii (to send a connection indication to user 2) and so on. Therefore, PFRS has no idea in direct message forwarding.

SUMMARY OF THE INVENTION

The object of this invention is to provide a method for forwarding a direct message in a partial function OFDMA relay system. With this method, the system performance may still be guaranteed effectively on the premise of reducing system cost.

To achieve the object mentioned above, a method for forwarding a direct message in a partial function OFDMA relay system comprising steps of:

user 1 transmitting a connection request to the PFRS via an uplink control channel;

when a receiving and decision module in the PFRS receives this connection request, finding that the connection request is transferred via the uplink control channel and then enabling a forwarding module to forward this connection request to a BS;

when receiving this connection request, the BS finding that a RS where the requested destination user 2 locates is a PFRS, then the BS transmitting a connection notification message to the PFRS via a downlink control channel;

when the receiving and decision module in the receives this connection notification, finding that the connection notification is transferred via the downlink control channel, and then enabling the forwarding module to forward the connection notification to user 2;

when a connection notification receiving module of user 2 receives this connection notification, replying a connection ACK via the uplink control channel;

when the receiving and decision module in the PFRS receives this connection ACK, finding that the connection ACK is transferred via the uplink control channel, and then enabling the forwarding module to forward connection ACK to the BS;

when the BS receives this connection ACK, the BS enabling the connection ACK forwarding module to forward the connection ACK to the PFRS;

when the receiving and decision module in the PFRS receives this connection ACK, finding that the connection ACK is transferred via the downlink control channel, and then enabling the forwarding module to forward connection ACK to user 1;

when the connection ACK receiving module of user 1 receives this connection ACK, considering that the connection has been successfully established;

wherein a schedule module in the BS finds out that user 1 shares the same PFRS with user 2, the schedule module enables direct message forwarding, user 1 is arranged to transmit data via the uplink reflection data channel of the PFRS, and user 2 is arranged to receive data via the downlink reflection data channel of the PFRS.

In present invention, the operations like forwarding and reflecting are fixed for the PFRS. Therefore, BS schedules according to the fixed operations so as to make the PFRS actually bear the function of direct message forwarding.

DETAILED DESCRIPTION OF THE PREFERRED EMBODIMENTS

Figure 1:
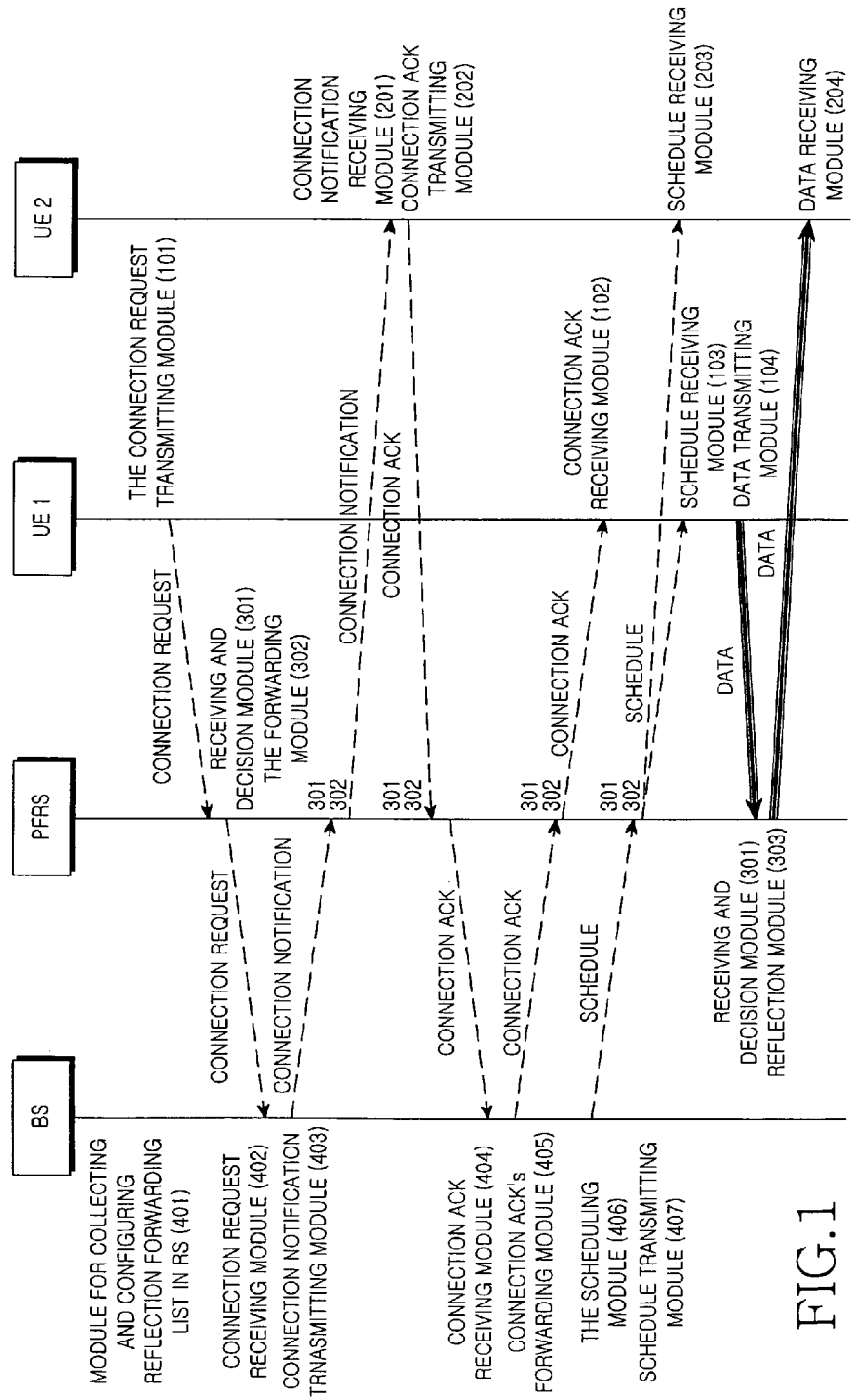
FIG. 1 is a flow of DMF implemented in BS by PFRS and users.
Figure 2:
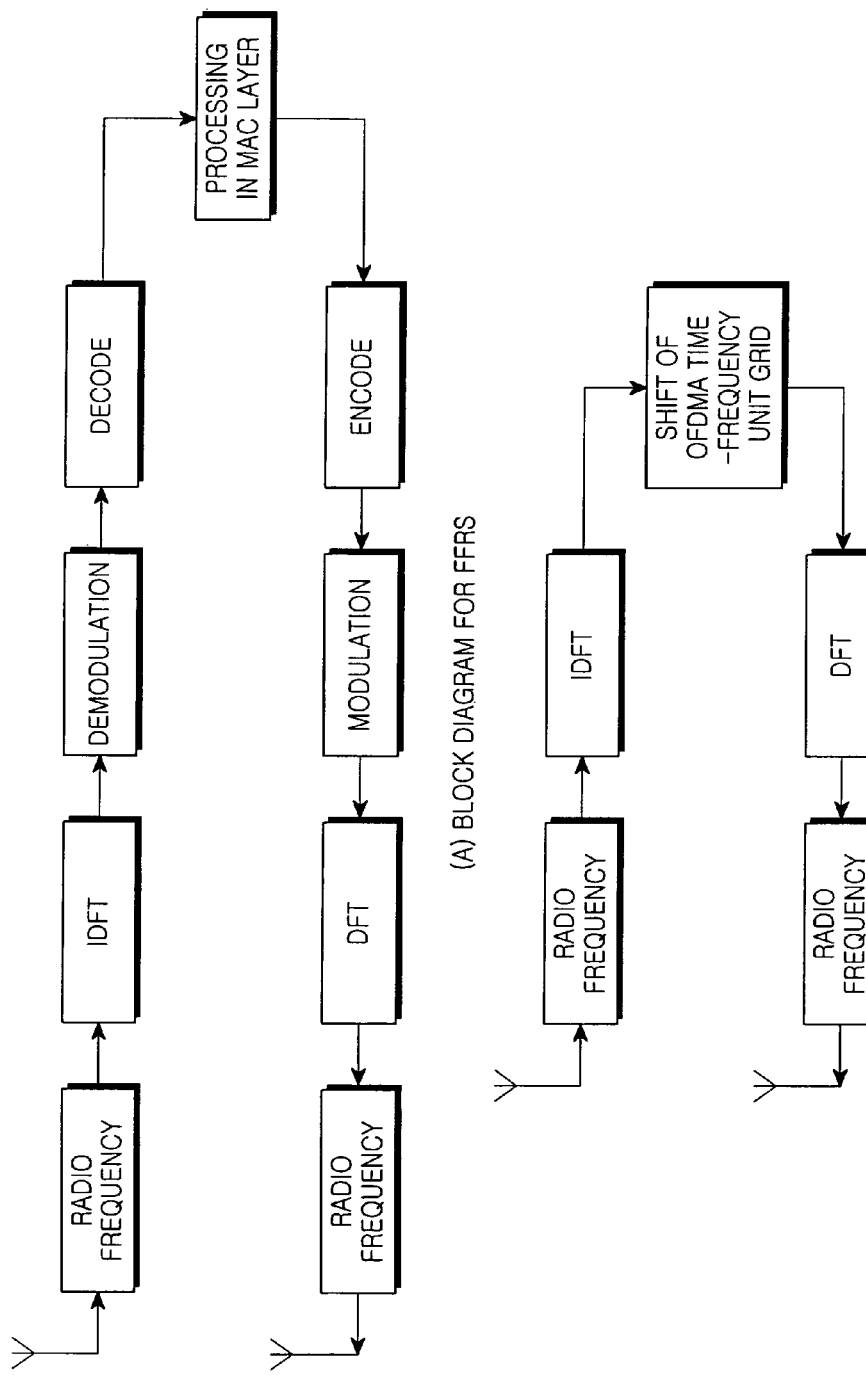
FIG. 2 shows comparison on function modules between PFRS and a conventional FFRS.

Now, components according to present invention are described with reference to the drawings. A source user end consists of following modules:

101: Connection request transmitting module, which transmits a connection request to a BS or a RS;

102: Connection ACK receiving module, which receives a connection ACK from the BS or the RS, indicating that the connection has been successfully established;

103: Schedule receiving module, which receives a schedule from the BS or the RS;

104: Data transmitting module, which transmits data via the OFDMA time frequency grid specified by the schedule which is received by module 103.

The destination user end consists of following modules:

201: Connection notification receiving module, which receives a connection notification from the BS or the RS, indicating that the source user wants to establish a connection with the destination user;

202: Connection ACK transmitting module, which transmits a connection ACK to the BS or the RS;

203: Schedule receiving module, which receives a schedule from the BS or the RS;

204: Data receiving module, which receives data in the OFDMA time frequency grid specified by the schedule which is received in module 203.

The PFRS consists of following modules:

301: Receiving and decision module, which determines whether to enable a forwarding module or a reflecting module according to the OFDMA time frequency grid where the message (received from user) locates. If the message comes from the BS, it always enables the forwarding module;

302: Forwarding module, which forwards the message received from user to the BS, and forwards the message received from the BS to user;

303: Reflection module, which forwards the messages received from users to other users.

BS in a cell consists of following modules:

401: Module for collecting and configuring relay reflection forwarding list, which collects the information on the state of forwarding/reflecting of relay OFDMA time frequency grid in the cell, i.e., which OFDMA time frequency grids are forwarded to the BS and which are reflected to users.

402: Connection request receiving module, which receives a connection request from a user or RS;

403: Connection notification transmitting module, which finds out which RS the destination user belongs to after the connection request is received by the connection request receiving module 402, and then transmits the connection notification to the RS;

404: Connection ACK receiving module, which receives a connection ACK from a user or RS;

405: Connection ACK forwarding module, which forwards a connection ACK to a sender that transmits the connection request corresponding to the connection ACK after the it is received by the connection ACK receiving module 404;

406: Schedule module, which determines which OFDMA time frequency grids should be allocated to source user and destination user respectively according to the reflection forwarding list corresponding to the RS where the source user and the destination user locate;

407: Schedule transmitting module, which transmits the schedule (i.e., the allocation of OFDMA time frequency grids for source user and destination user) generated by the schedule module to RSs and users.

Based on the structure mentioned above, DMF is realized cooperatively by the user, the RS and the BS, as shown in FIG. 1. To give a brief illustration on the inter-operation among the modules in the system, some modules are omitted here.

Now, an embodiment according to present invention is proposed.

Figure 3:
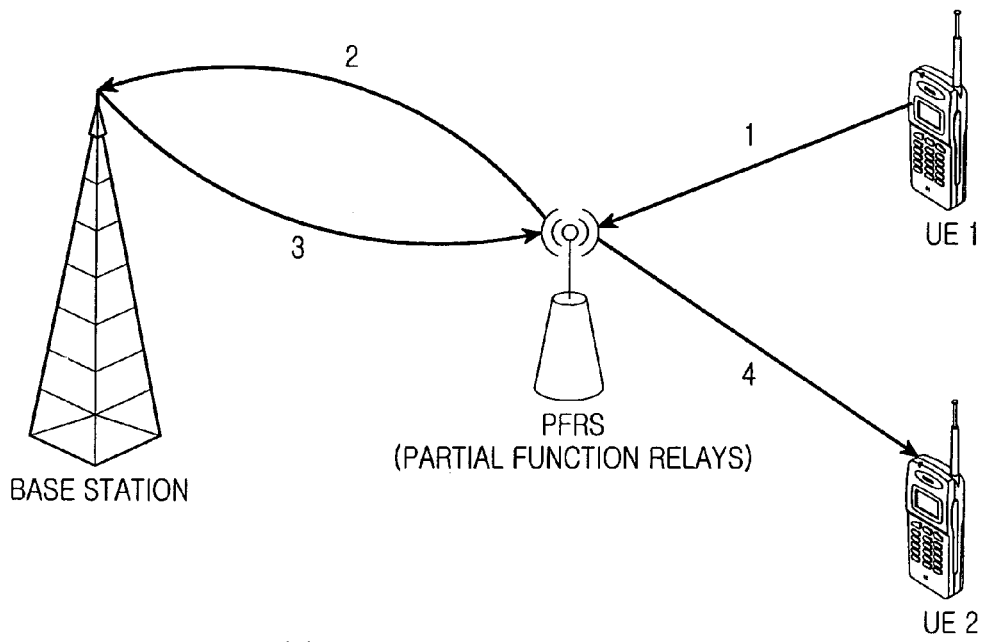
FIG. 3 shows comparison between a conventional message forwarding and DMF.
Figure 3:
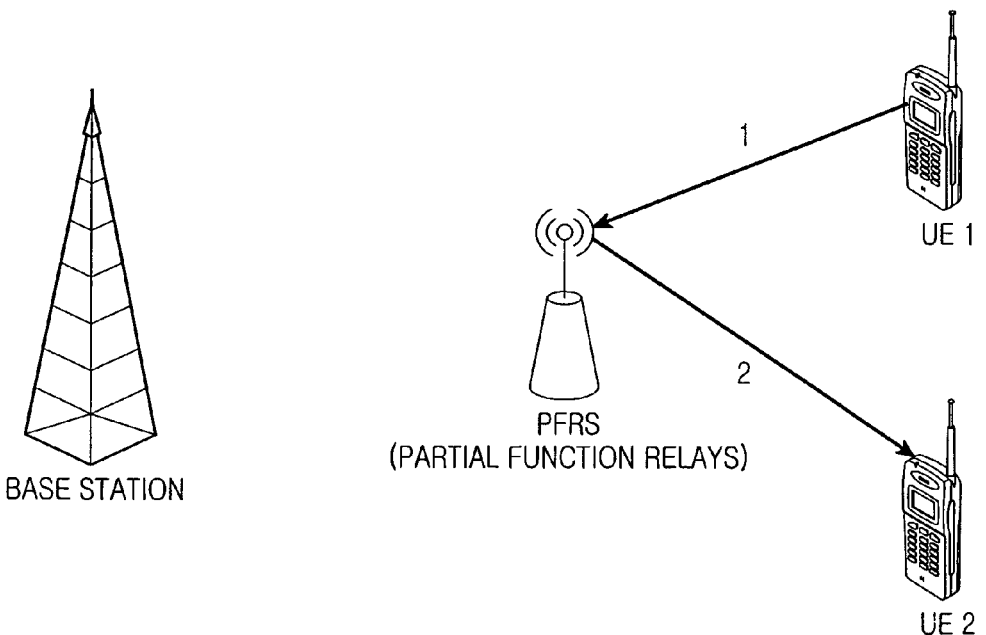
Figure 4:
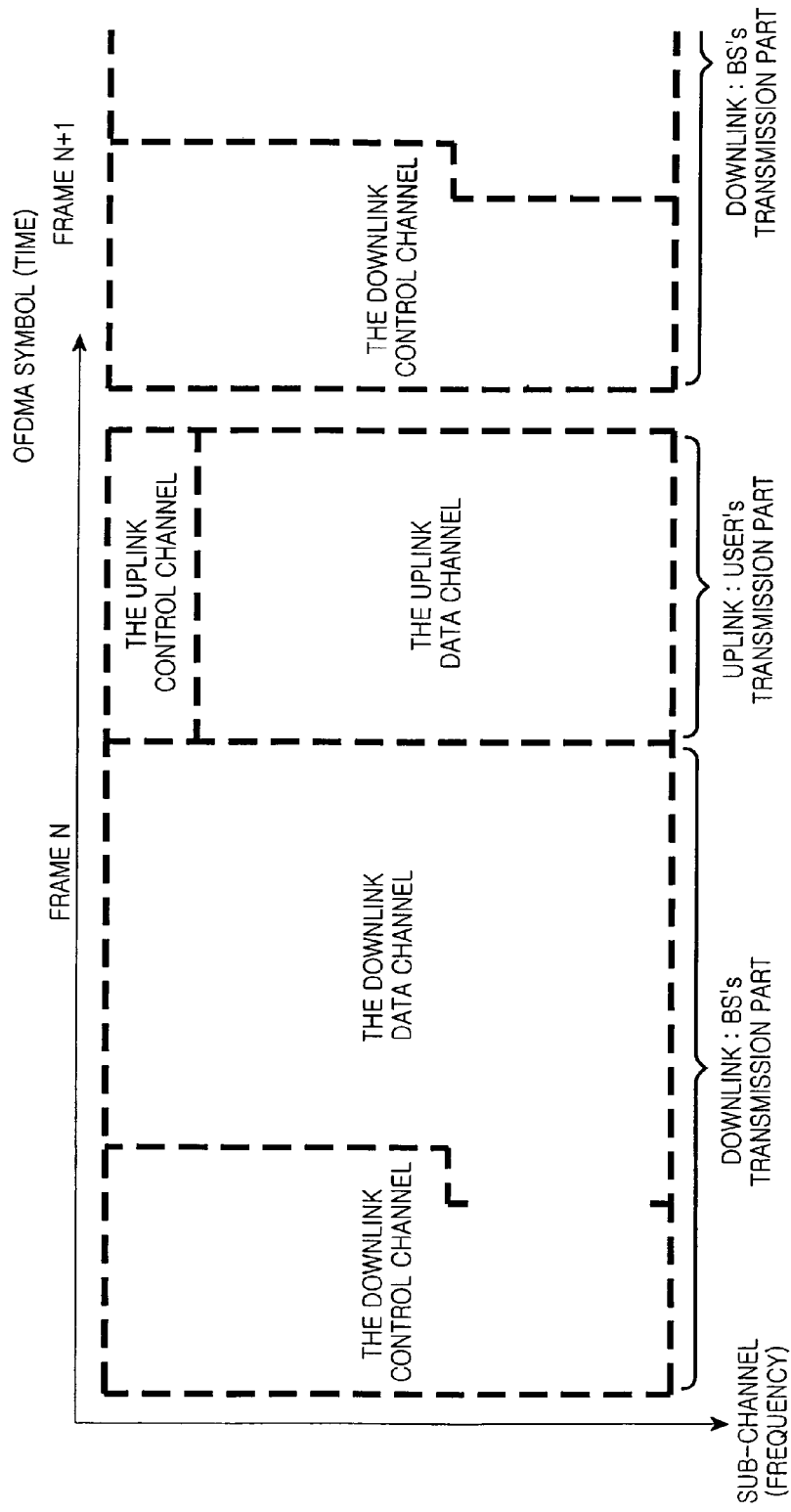
FIG. 4 shows a block diagram of conventional WiMax system.

The topology of the embodiment is shown in FIG. 3. In figure, a BS, a PFRS, and user 1, user 2 (both are potential in communication) are shown. Here, the OFDMA frame structure adopted in BS in conventional WiMax system is illustrated in FIG. 4. In FIG. 4, OFDA symbols are arranged in the horizontal direction (i.e., time), and sub-channels are arranged in the vertical direction (i.e., frequency). Given the OFDM symbol and the serial number of the sub-channel, an OFDMA time frequency grid is obtained. The OFDMA frame structure in the BS may be divided into two parts: the downlink parts (i.e., the transmission part in the BS) and the uplink parts (i.e., the transmission part in the user). Here, both of the uplink and downlink parts may be sub-divided into control channels and data channels.

Figure 5:
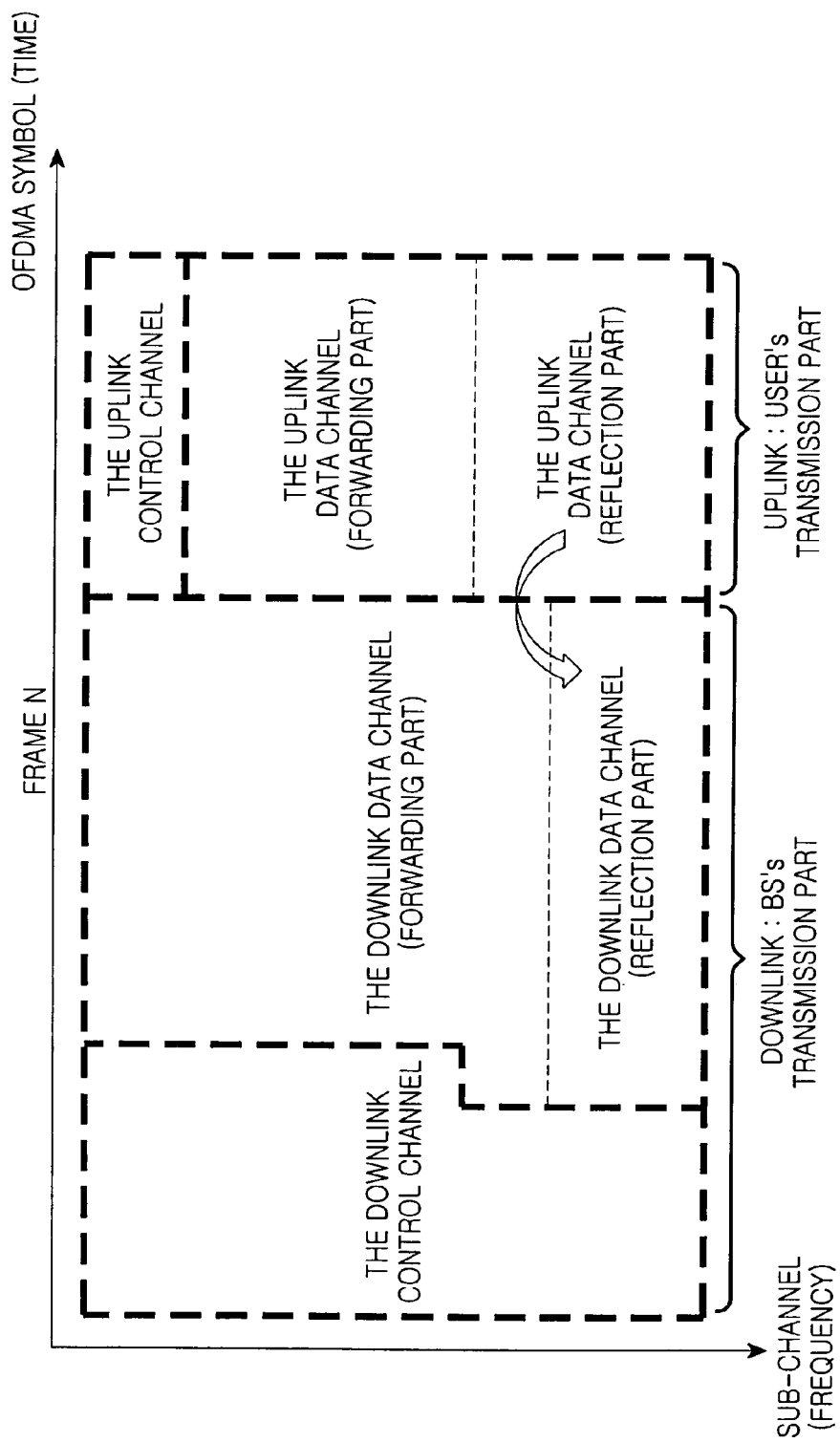
FIG. 5 shows a block diagram of PFRS.

In order to make the PFRS implement DMF function, the OFDMA frame structure of the PFRS differs from the conventional slightly, as shown in FIG. 5. A data channel in the OFDMA frame structure for the PFRS can be sub-divided into the reflection data channel and the forwarding data channel. Here, the data in the uplink reflection data channel will not be forwarded to the BS but retransmitted through the downlink reflection data channel.

The nodule for collecting and configuring the relay reflecting and forwarding list in the BS is used for collecting the configurations of reflection data channels and the forwarding data channels for the PFRS so as to obtain the specified OFDMA time frequency unit grids, through which the data will be forwarded to itself or reflected directly to the other users of the RS. With this prior knowledge, if the two potential communication users are arranged within the same PFRS by BS, data of user 1 may be transferred through uplink reflection data channel and user 2 is informed to receive data via corresponding downlink reflection data channel so as to reach the object of DMF.

Detailed signaling flow of the example is as follows:

Step 1, User 1 sends a connection request to the PFRS via the uplink control channel;

Step 2, After receiving and decision module in the PFRS receives this connection request, it finds out that the connection request is transferred via the uplink control channel and then enables the forwarding module to forward this connection request to BS;

Step 3, when the BS receives this connection request, it finds out that the RS where the requested destination user 2 locates is a PFRS. Then it sends a connection notification message to the PFRS via the downlink control channel;

Step 4, when the receiving and decision module in the PFRS receives this connection notification, it finds out that the connection notification is transferred via the downlink control channel, and then enables the forwarding module to forward it to user 2;

Step 5, when connection notification receiving and decision module in user 2 receives this connection notification, it replies a connection ACK via the uplink control channel;

Step 6, when the receiving and decision module in the PFRS receives this connection ACK, it finds out that the connection ACK is transferred via the uplink control channel, and then enables the forwarding module to forward it to the BS;

Step 7, when the BS receives this connection ACK, it enables the connection ACK forwarding module to forward it to the PFRS;

Step 8, when receiving and decision module in the PFRS receives this connection ACK, it finds out that the connection ACK is transferred via the downlink control channel, and then enables the forwarding module to forward it to user 1;

Step 9, when the connection ACK receiving module of user 1 receives this connection ACK, it considers that the connection has been successfully established;

Step 10, the schedule module in the BS finds out that user 1 shares the same PFRS with user 2, it implements direct message forwarding. After the BS obtains the locations and mapping of uplink and downlink reflection data channel for the RS through the module for collecting and configuring reflecting and forwarding list in the RS, the schedule is configured so that: user 1 is arranged to transmit data via the uplink reflection data channel of the PFRS, and user 2 is arranged to receive data via the corresponding downlink reflection data channel of the PFRS.

Step 11, the schedule transmitting module in the BS transmits the schedule generated by the schedule module to the PFRS via the downlink control channel;

Step 12, when the PFRS receives this schedule, it finds out that the schedule is transferred via the downlink control channel, and then enables the forwarding module to forward it to user 1 and user 2;

Step 13, when user 1 receives this schedule, it checks the schedule items corresponding to himself/herself;

Step 14, when user 2 receives the schedule, it checks the schedule items corresponding to himself/herself;

Step 15, User 1 transmits data via the uplink reflection data channel according to the schedule items;

Step 16, when the receiving and decision module in the PFRS receives the data, it finds out that the data comes from the uplink reflection data channel, and then enables the reflecting module to transmit data via the downlink reflection data channel;

Step 17, User 2 prepares for data receiving on the downlink reflection data channel according to the received schedule, and just receives data from the PFRS. Now, the entire communication process completes.

What is claimed is:

1. A method for forwarding a direct message by a Partial Function Relay Station (PFRS) of an Orthogonal Frequency Division Multiple Access (OFDMA) system, the method comprising the steps of
receiving a connection request at the PFRS from a first User Equipment (UE), wherein the connection request relates to a connection between the first UE and a second UE;
if the connection request is received from the first UE via an uplink control channel of the PFRS, forwarding the connection request from the PFRS to a Base Station (BS);
receiving data at the PFRS from the first UE;
if the data is received from the first UE via an uplink reflection data channel of the PFRS, forwarding the data from the PFRS to the second UE via a downlink reflection data channel of the PFRS;
receiving a schedule from the BS, wherein the schedule defines direct forwarding over the uplink reflection data channel and the downlink reflection data channel between the first UE and the second UE; and
if the schedule is received from the BS via the downlink control channel, forwarding the schedule to the first UE and the second UE.

2. The method of claim 1, further comprising:
receiving a connection notification from the BS, in response to the connection request; and
if the connection notification is received from the BS via a downlink control channel of the PFRS, forwarding the connection notification to the second UE.

3. The method of claim 2, further comprising:
receiving a connection Acknowledgement (ACK) from the second UE in response to the connection notification; and
if the connection ACK is received from the second UE via the uplink control channel, forwarding the connection Acknowledgement (ACK) to the BS.

4. The method of claim 3, further comprising:
receiving the connection ACK from the BS; and
if the connection ACK is received from the BS via the downlink control channel, forwarding the connection ACK to the first UE.

5. A Partial Function Relay Station (PFRS) of an Orthogonal Frequency Division Multiple Access (OFDMA) system, the PFRS comprising:
a receiving and decision module that receives a connection request from a first User Equipment (UE), and receives data from the first UE, wherein the communication request relates to a connection between the first UE and a second UE;
a forwarding module that forwards the connection request to a Base Station (BS) if the connection request is received from the first UE via an uplink control channel of the PFRS; and
a reflection module that forwards the data to the second UE via a downlink reflection data channel of the PFRS, if the data is received from the first UE via an uplink reflection data channel of the PFRS,
wherein the receiving and decision module receives a schedule from the BS, and the schedule defines direct forwarding over the uplink reflection data channel and the downlink reflection data channel between the first UE and the second UE, and
wherein, if the schedule is received from the BS via the downlink control channel, the forwarding module forwards the schedule to the first UE and the second UE.

6. The PFRS of claim 5, wherein the receiving and decision module receives a connection notification from the BS in response to the connection request; and
if the connection notification is received from the BS via a downlink control channel of the PFRS, the forwarding module forwards the connection notification to the second UE.

7. The PFRS of claim 6, wherein the receiving and decision module receives a connection Acknowledgement (ACK) from the second UE in response to the connection notification, and
if the connection ACK is received from the second UE via the uplink control channel, the forwarding module forwards the connection ACK to the BS.

8. The PFRS of claim 7, wherein the receiving and decision module receives the connection ACK from the BS; and
if the connection ACK is received from the BS via the downlink control channel, the forwarding module forwards the connection ACK to the first UE.

* * * * *